United States Patent
Betz

(10) Patent No.: US 6,682,102 B1
(45) Date of Patent: Jan. 27, 2004

(54) HOSE-IN-HOSE COUPLER

(76) Inventor: James C. Betz, 11 S. Main, South Bend, IN (US) 46601

(*) Notice: Subject to any disclaimer, the term of this patent is extended or adjusted under 35 U.S.C. 154(b) by 0 days.

(21) Appl. No.: 10/252,230

(22) Filed: Sep. 23, 2002

(51) Int. Cl.⁷ .................................................. F16L 39/04
(52) U.S. Cl. .......................... 285/123.15; 285/284.1; 285/123.1
(58) Field of Search .................... 285/31, 32, 123.1, 285/123.15, 123.16, 123.17, FOR 120, FOR 113, 284.1

(56) References Cited

U.S. PATENT DOCUMENTS

| | | | | |
|---|---|---|---|---|
| 578,474 A | * | 3/1897 | Thompson et al. | 285/32 |
| 797,911 A | * | 8/1905 | Ferry | 285/32 |
| 1,217,543 A | * | 2/1917 | White | 285/123.15 |
| 1,349,663 A | * | 8/1920 | Cumfer | 285/123.15 |
| 4,108,476 A | * | 8/1978 | Krupp | 285/47 |
| 4,687,232 A | * | 8/1987 | Zimmerman | 285/31 |
| 5,011,193 A | * | 4/1991 | Porte | 285/31 |
| 5,088,774 A | * | 2/1992 | Spiegelman | 285/123.1 |
| 5,141,256 A | * | 8/1992 | Ziu | 285/13 |
| 5,547,231 A | * | 8/1996 | Sharp | 285/123.15 |
| 6,196,596 B1 | * | 3/2001 | Kwok et al. | 285/123.1 |
| 2002/0093195 A1 | * | 7/2002 | Poehler | 285/123.1 |

FOREIGN PATENT DOCUMENTS

| | | | | |
|---|---|---|---|---|
| CA | 672802 | * | 10/1963 | 285/FOR 120 |
| DE | 1119609 | * | 12/1961 | 285/FOR 113 |
| DE | 3936588 | * | 5/1991 | 285/FOR 120 |
| DE | 10064227 | * | 6/2002 | |
| FR | 1529814 | * | 6/1968 | 285/FOR 113 |

* cited by examiner

*Primary Examiner*—Eric K. Nicholson
(74) *Attorney, Agent, or Firm*—Botkin & Hall, LLP

(57) ABSTRACT

A Hose-In-Hose coupler having a primary or inner hose assembly and a surrounding secondary or outer hose assembly. The secondary hose assembly is connected by slideable sleeves which when disconnected may by extended or separated to expose the primary hose assembly.

10 Claims, 6 Drawing Sheets

VIEW A

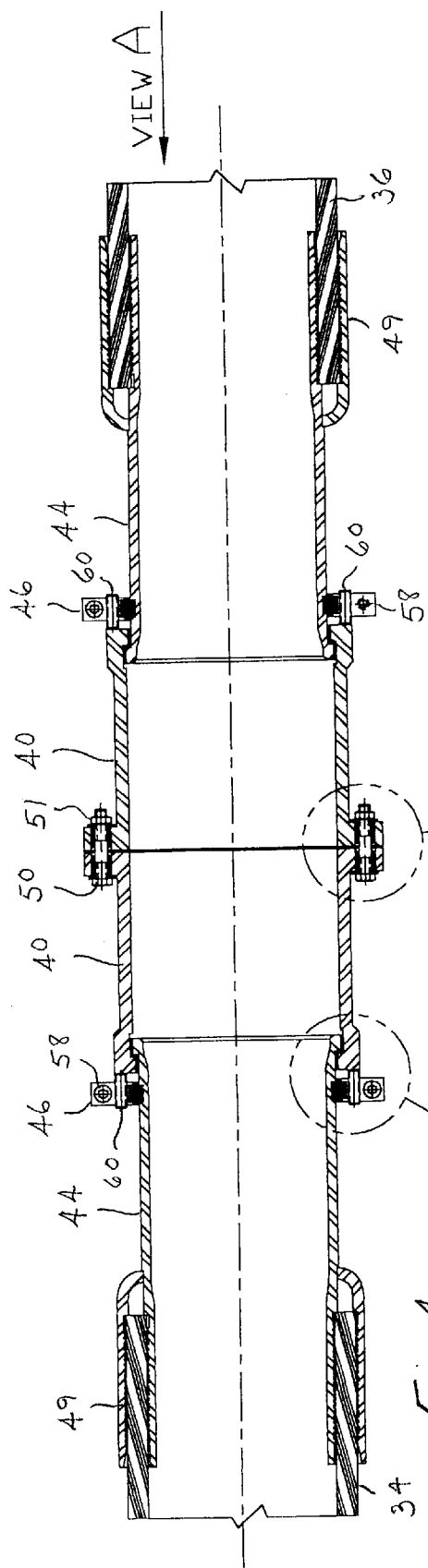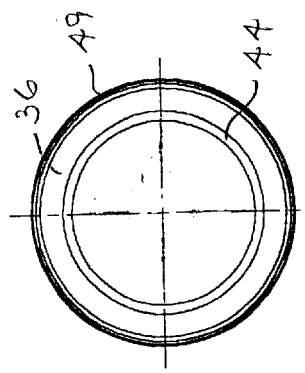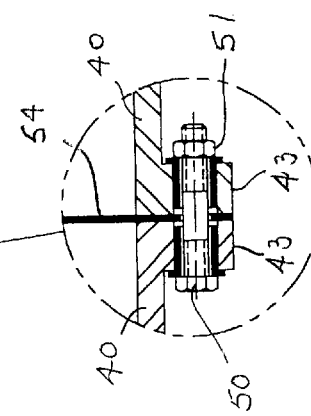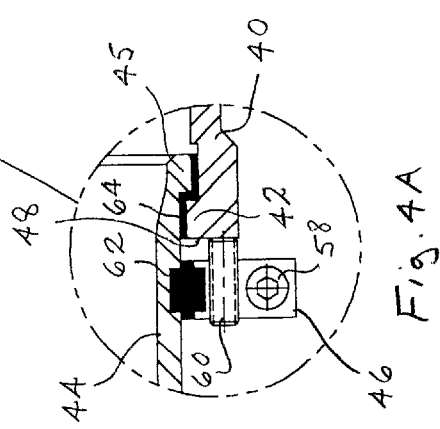

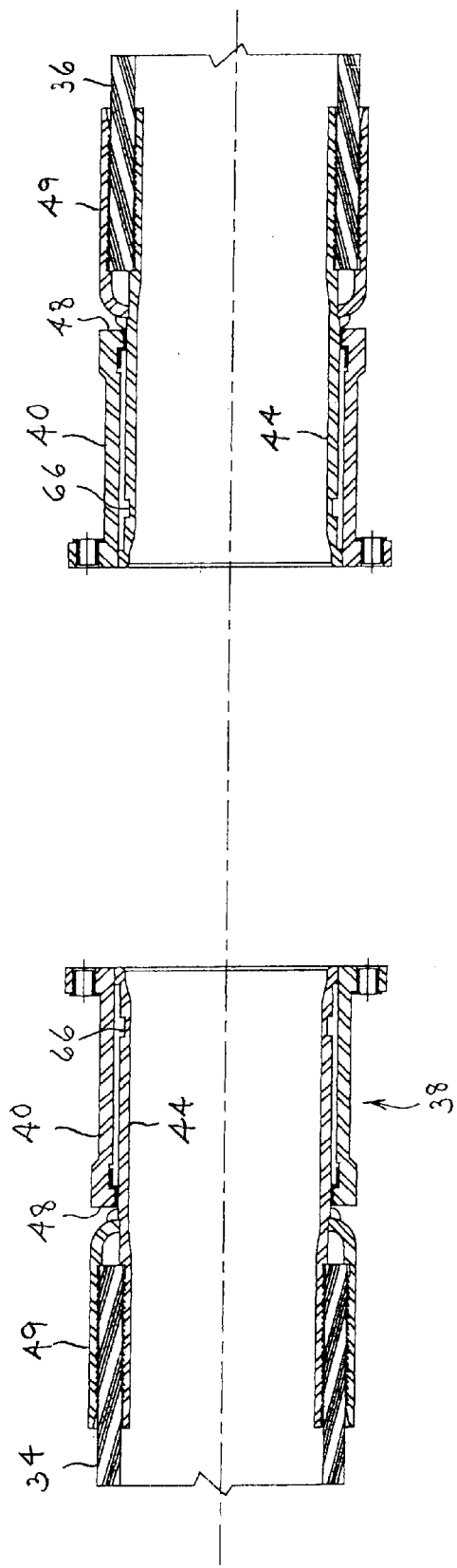

HOSE-IN-HOSE COUPLER

BACKGROUND OF THE INVENTION

1. Field of the Invention

The present invention relates to a Hose-In-Hose, and, more particularly, to a Hose-In-Hose secondary coupler.

2. Description of the Related Art

It is known that Hose-In-Hoses have been used to transport liquid waste, such as nuclear waste, to a place away from the source.

A problem with current Hose-In-Hose configurations is that once the outer hose is disconnected via a coupler, the separated ends must be physically pulled apart to allow access to the inner hose. Although on shorter lengths of hose this may not present much of a problem, as the length of the hose increases the difficulty in providing adequate force to pull apart the disconnected ends also increases. The ability to adequately separate the disconnected ends of the outer hose to a significant distance thereby allowing access to the inner hose relies on strength of the end user. Furthermore, longer hoses may not be able to be separated at the coupler due to the weight of the individual hose ends.

What is needed is a device which allows access to the inner hose without the need to substantially move the two disconnected ends of the outer hose.

SUMMARY OF THE INVENTION

The present invention relates to a Hose-In-Hose which can allow access to the inner hose without substantially moving the two disconnected ends of the outer hose.

The Hose-In-Hose of this invention includes an inner or primary hose assembly which has a first hose casing, a second hose casing, and a primary coupler, and an outer or secondary hose assembly. The primary coupler connects the first hose casing and the second hose casing of the primary hose assembly. The secondary hose assembly provides a third hose casing, a fourth hose casing, and a secondary coupler. The secondary hose assembly encloses the primary hose assembly. The secondary coupler of the outer hose assembly includes slideable sleeve parts having a joined position connecting the third hose casing and the fourth hose casing. The slideable sleeve parts have an open position which exposes the primary hose assembly.

Accordingly, it is an object of the present invention to provide for an improved way for accessing the primary hose in a Hose-In-Hose assembly.

Another object of this invention is to provide a way to connect the secondary assembly over the primary assembly in a confined space.

BRIEF DESCRIPTION OF THE DRAWINGS

The above-mentioned and other features and advantages of this invention, and the manner of attaining them, will become more apparent and the invention will be better understood by reference to the following description of a preferred embodiment of the invention taken in conjunction with the accompanying drawings, wherein:

FIG. 4 is a longitudinal sectional view of the secondary hose assembly connected, with FIGS. 4A and 4B showing detailed components and FIG. 4C being an end view A.

FIG. 5 is a longitudinal sectional view of the secondary hose assembly shown in an open position.

Corresponding reference characters indicate corresponding parts throughout the several views.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Figure 1:
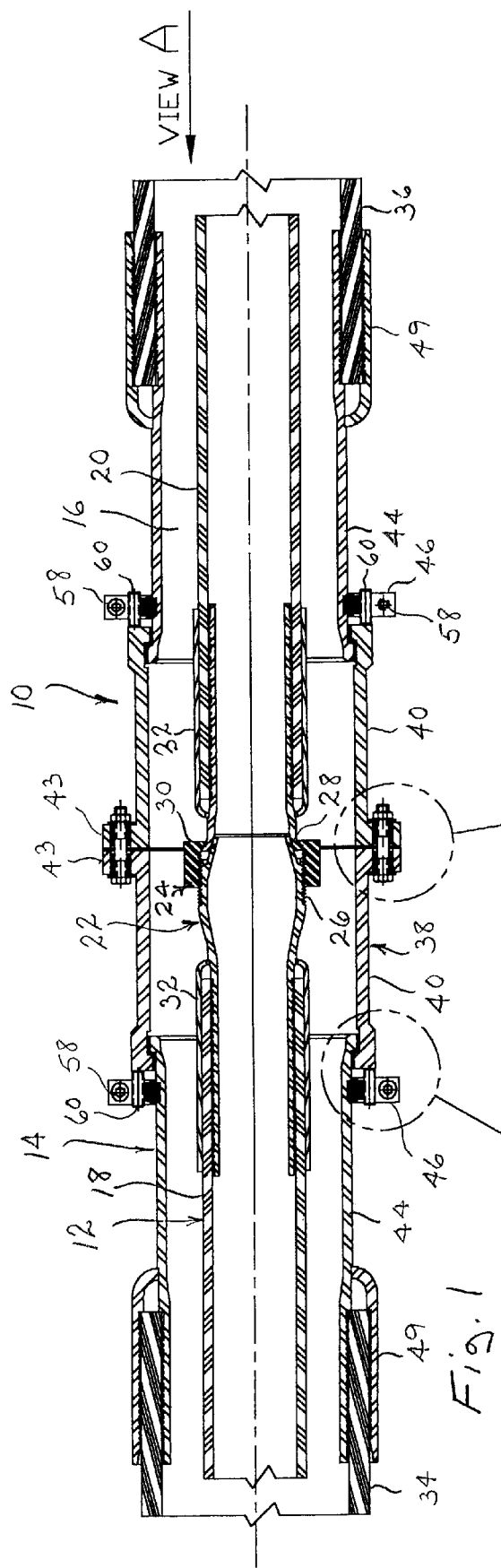
FIG. 1 is a longitudinal sectional view of the present invention showing the primary and secondary hose assemblies connected with FIGS. 1A and 1B showing detailed components and FIG. 1C being an end view A.

Referring now to the drawings, and more particularly to FIG. 1, reference character 10 generally designates a Hose-In-Hose constructed in accordance with a preferred embodiment of the present invention. Hose-In-Hose 10 includes two distinct components, namely, a primary or inner hose assembly 12 and an secondary or outer hose assembly 14.

As depicted, secondary hose assembly 14 completely encases the primary hose assembly 12 thereby creating a containment space 16 between the outer surface of the primary hose assembly 12 and the inner surface of the secondary hose assembly 14 for containing any liquids leaking from the primary hose assembly 12 due to a break or tear in the primary hose assembly. The primary hose assembly 12 may be used to transmit and contain liquids, for example and without the intention to limit, such as nuclear waste, hazardous liquid waste, or contaminated water.

Figure 1C:
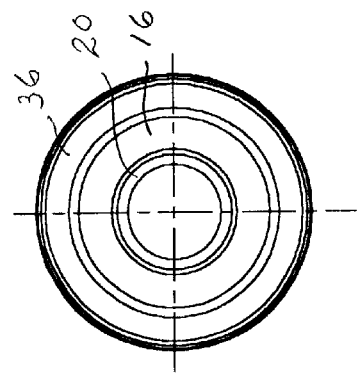
Figure 1B:
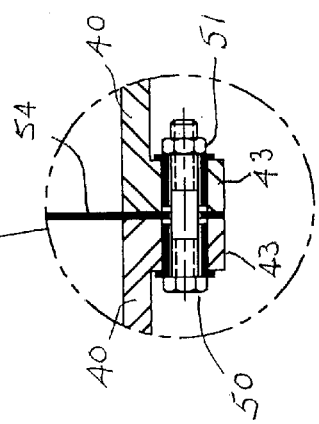

FIG. 1 shows Hose-In-Hose 10 as a closed system, meaning both the primary and secondary hose assemblies 12, 14 are each sealed. View A, FIG. 1C, is an end view of Hose-In-Hose 10. Primary hose assembly 12 includes a hose casing 18, a hose casing 20, and a primary inner coupler 22. Inner coupler 22 connects hose casing 18 and hose casing 20 in such a manner as to create a sealed closed system. Coupler 22 includes a female coupling part 24 and a male coupler part 26, each of which is attached to one of hose casings 18, 20 by means of swaged ferrule 32. Female coupling part 24 includes an outturned flanged retainer 28 which carries a rotatable nut 30. Male coupler part 26 is externally threaded and preferably tapered to fit into retainer 28 where it is secured by nut 30.

Figure 1A:
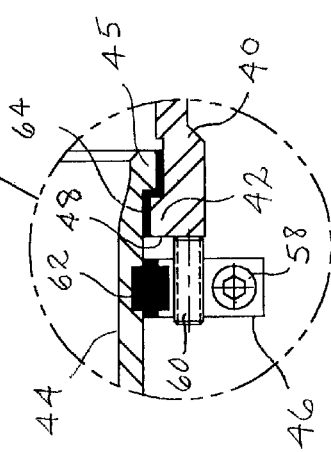
Figure 2:
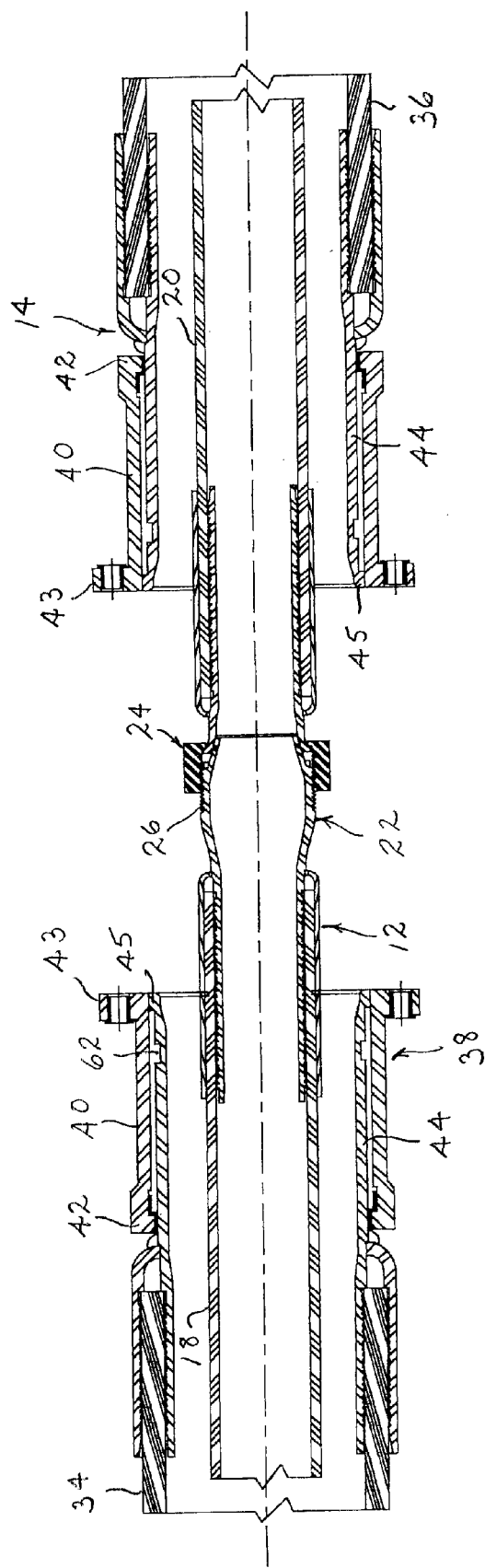
FIG. 2 is a longitudinal sectional view of the Hose-In-Hose showing the secondary coupler in an open position.

Secondary hose assembly 14 includes a hose casing 34, a hose casing 36, and a secondary or outer coupler 38. Outer coupler 38 provides for connecting hose casings 34, 36 to create a sealed closed system about primary hose assembly 12. Coupler 38 includes slideable sleeve parts 40, shanks 44 and collars 46. Each shank 44 is attached to its hose casing 34, 36 by a swaged ferrule 49. Sleeve parts 40 are separable having an extended position as shown in FIG. 1 and a retracted position as shown in FIG. 2. Each sleeve part 40 is provided with an in-turned annular flange 42 at one end and an outturned annular flange 43 at the opposite end. Sleeve parts 40 are mounted so as to slide longitudinally along shanks 44. In this manner, the sleeve parts 40 of outer coupler 38 can shift inward and outwardly relative to each other between their retracted position and extended position. Each shank 44 is provided with an outturned flange 45 so that as its supported sleeve part 40 slides outwardly over the shank, flange 42 of the sleeve part contacts and abuts flange 45 of the shank, thus restricting any further outward movement, retaining the sleeve part in its extended position as best seen in FIGS. 1A and 4A.

As can be seen in FIGS. 1 and 4, when sleeve parts 40 are in their extended position flanges 43 are aligned in a face to face orientation, with, preferably, an annular gasket 54 located between. The flanges 43 are joined and secured by annularly spaced bolts 50 and nuts 51.

Figure 6:
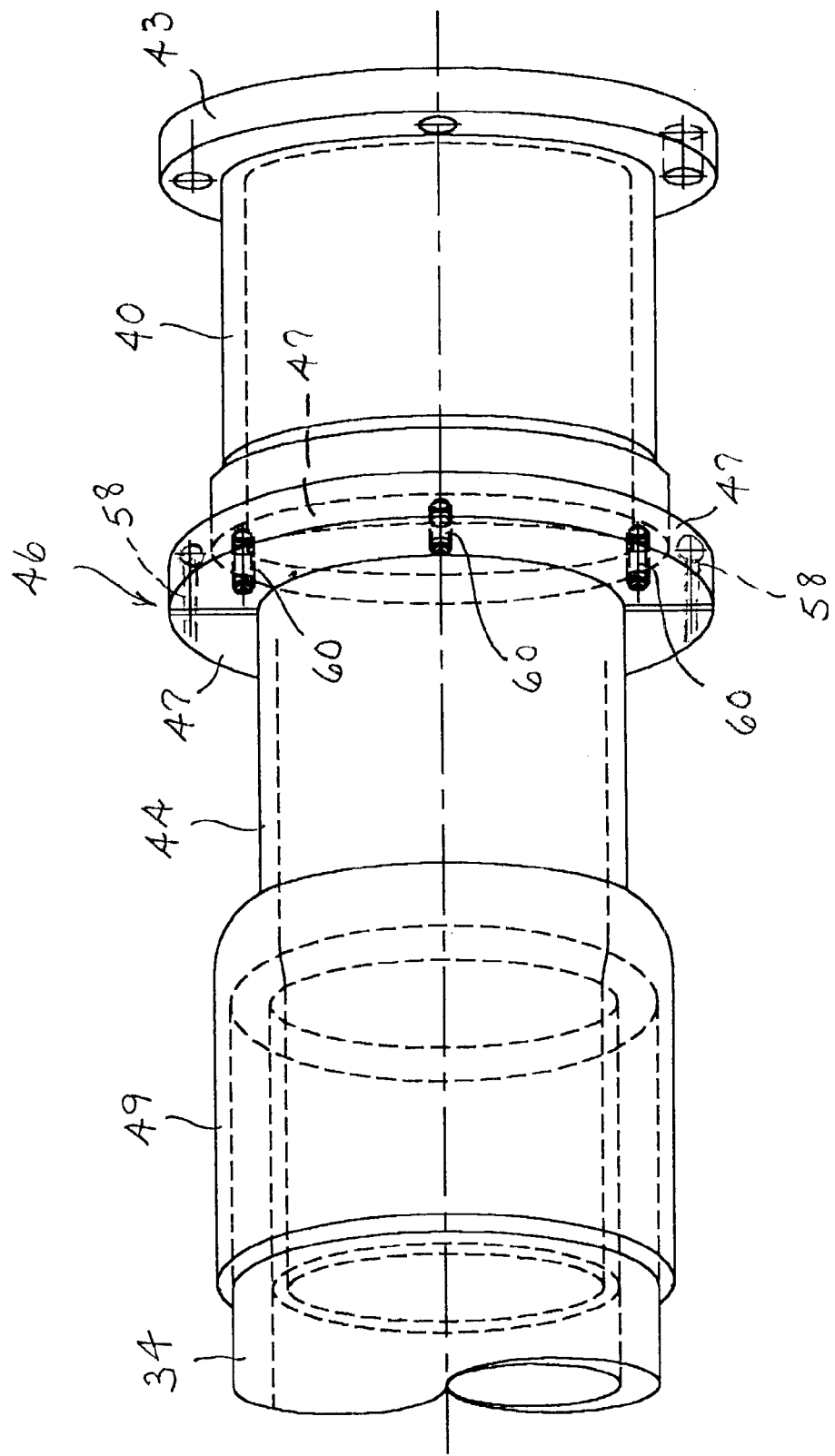
FIG. 6 is a fragmentary perspective view of one secondary coupler part of the secondary hose assembly.

Sleeve parts 40 are secured in their extended position upon shanks 44 by collars 46. Each collar is formed of two semi-circular parts 47 (see FIG. 6) joined by screws 58. Once sleeve parts 40 are extended, parts 47 of collars 46 are placed round shanks 44 and joined by screws 58 with an annular rib 62 carried by each collar fitting restrictively in an annular groove 66 in each shank 44 so as to fixedly position each collar next to the end face 48 of the adjacent sleeve.

Within each collar 46 and arranged peripherally about the collar are threaded bores 59. Securement screws 60 are turned through each collar in bores 59 into contact with the adjacent sleeve end face 48 to urge sleeve flange 42 toward shank flange 45, compressing an annular seal 64 to form a complete liquid seal between each shank and sleeve. Rib 62 may be in the form of an insulator envisioned to work in conjunction with non-conductive hose to allow for the use of a leak detector.

Figure 3:
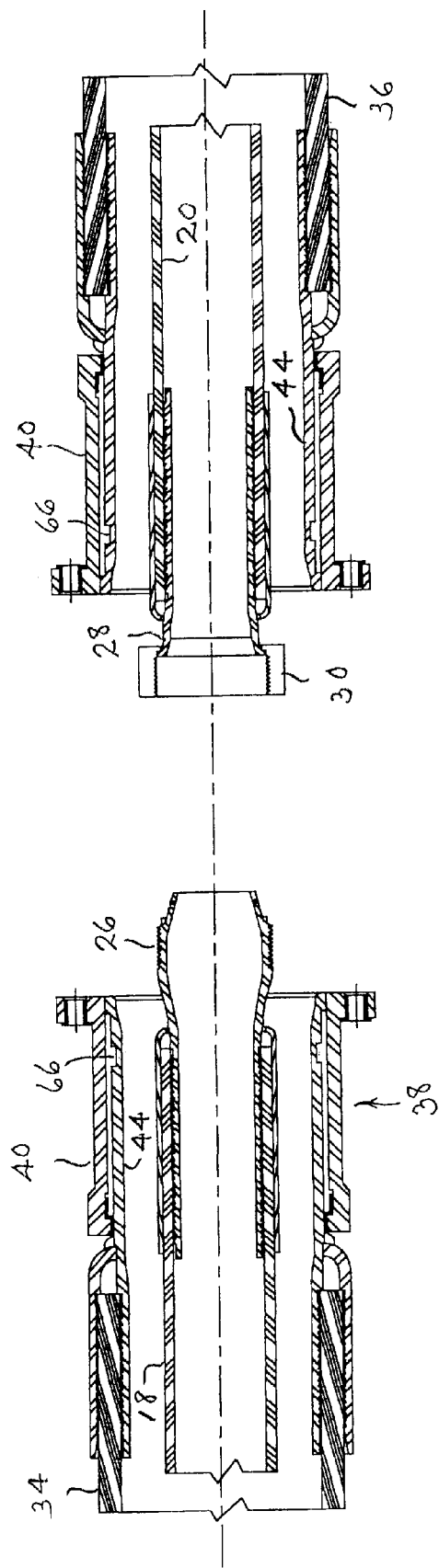
FIG. 3 is a longitudinal sectional view of the Hose-In-Hose showing the primary and secondary hose assemblies in open positions.

Referring now to FIGS. 2, 3, and 5, sleeve parts 40 are shown in their retracted position thereby opening secondary or outer coupler 38 of secondary hose assembly 14. This may be accomplished by removing collars 46 by loosening securement screws 60 and the removal of screws 58 so the two halves or parts 47 of each collar can be separated and removed from engagement with its associated shank 44. Then disconnecting flanges 43 by removing bolts 50 and nuts 51 frees sleeve parts 40 from their secured extended position and allows for outer coupler 38 to be opened by retracting and sliding sleeve parts 40 longitudinally along shanks 44. Although collars 46 are shown completely removed, they could be simply slid along the sleeve parts 40 by sufficiently loosening bolts 58 to allow the collar parts 47 to be spread apart.

When sleeve parts 40 are secured in their extended position, outer, coupler 38 is in a joined position connecting hose casings 34, 36 in a sealed position (FIGS. 1 and 4). When sleeve parts 40 are in their retracted position, outer coupler 38 is in an open position (FIGS. 2 and 3) thereby exposing primary hose assembly 12 and its coupler 22 to allow it to be opened or repaired.

Hose-In-Hose 10 will contain liquids which may leak from a rupture of primary hose assembly 12 and prevent such potentially hazardous liquids from causing damage to the environment or injury to the end user. Secondary or outer coupler 38 provides the advantage of allowing access to the primary hose assembly 12 via the use of slideable sleeve parts 40 without needing to further separate hose casings 34, 36. This is a significant improvement upon the prior art. Further, the use of insulated materials would allow use of a signal or an alarm device, which may be present on or around the assembly, thereby notifying the end user of leakage from the primary hose.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed:

1. A Hose-In-Hose comprising:

a primary hose assembly including a first hose casing, a second hose casing, and a first releasable coupler assembly; said first coupler assembly connecting said first hose casing and said second hose casing; a secondary hose assembly including a third hose casing, a fourth hose casing, and a second releasable coupler assembly; said secondary hose assembly enclosing said primary hose assembly; said second releasable coupler assembly including separable slideable sleeve parts each having an extended position connecting said third hose casing and said fourth hose casing; said slideable sleeve parts each having a retracted position disconnecting the third and fourth hose casings to expose said primary hose assembly and its first releasable coupler assembly.

2. The Hose-In-Hose assembly of claim 1, wherein said second releasable coupler assembly includes a collar for securing one of said sleeve parts in said extended position.

3. The Hose-In-Hose assembly in claim 2, wherein said second releasable coupler assembly includes a second collar for securing another of said sleeve parts in said extended position.

4. The Hose-In-Hose assembly of claim 3, wherein said second releasable coupler assembly includes a tubular shank connected to each of said third and fourth casings; said one sleeve part fitted slidably over one said shank; said another sleeve part fitted slidably over the other said shank; said first mentioned collar fitted about said one shank; and second collar fitted about said other shank.

5. The Hose-In-Hose assembly of claim 4 and first abutment parts carried by said one sleeve part and one shank for preventing separation of the sleeve part and one shank when the sleeve part is in said extended position; second abutment parts carried by said another sleeve part and other shank for preventing separation of the another sleeve part and other shank when the another sleeve part is in said extended position.

6. The Hose-In-Hose assembly of claim 5 wherein said first mentioned collar is releasably secured to said one shank and carries parts in abutment with said one sleeve part to secure the one sleeve part in said extended position; said second collar is releasably secured to said other shank and carries other parts in abutment with said another sleeve part to secure the another sleeve part in said extended position; said sleeve parts joined when in said extended position.

7. A double hose comprising:

an inner hose assembly including a first hose casing, a second hose casing, and an inner releasable coupler assembly releasably connecting an end of the first hose casing to an opposing end of the second hose casing;

an outer hose assembly coaxially enclosing said inner hose assembly including a third hose casing coaxially about said first hose casing, a fourth hose casing coaxially about said second hose casing, and an outer releasable coupler assembly releasably connecting an end of the third hose casing to an opposing end of the fourth hose casing;

said outer coupler assembly including
- a first sleeve slidably mounted to said end of said third hose casing,
- a second sleeve slidably mounted to said end of said fourth hose casing,
- said sleeves each having an extended position connecting said third and fourth hose casings to cover said inner hose assembly and its first releasable coupler assembly, and a retracted position disconnecting the third and fourth hose casings to expose said inner hose assembly and its first inner coupler assembly while coupled;

wherein said sleeves are slidably shiftable between said extended and retracted positions.

8. The double hose assembly of claim 7 wherein said outer releasable coupler assembly further includes:
- a first collar abuttedly fitted about said third hose casing for releasably securing said first sleeve in its said extended position; and,
- a second collar abuttedly fitted about said fourth hose casing for releasably securing said second sleeve in its said extended position.

9. The double hose assembly of claim 8 wherein each of said collars further include:
- an adjustment screw for urging said sleeves toward their said extended positions.

10. The double hose assembly of claim 9 wherein said third and fourth hose casings each include abutment means for preventing the slidable separation of their respective first and second sleeves when in their said extended positions.

* * * * *